United States Patent [19]

Buonomo et al.

[11] Patent Number: 4,520,440

[45] Date of Patent: May 28, 1985

[54] TEST VERIFICATION OF PROCESSOR ARCHITECTURE HAVING A PARTIAL INSTRUCTION SET

[75] Inventors: Joseph P. Buonomo, Endicott; Wendell L. Perry, Apalachin, both of N.Y.

[73] Assignee: International Business Machines Corporation, Armonk, N.Y.

[21] Appl. No.: 449,929

[22] Filed: Dec. 15, 1982

[51] Int. Cl.³ .............................................. G06F 11/00
[52] U.S. Cl. .................................... 364/200; 371/16; 371/25
[58] Field of Search ...................... 371/16, 19, 25, 20; 364/200 MS File

[56] References Cited

U.S. PATENT DOCUMENTS 3,544,777 12/1970 Winkler ............................ 371/25 X
4,231,087 10/1980 Hunsberger et al. ............... 364/200
4,312,066 1/1982 Banz et al. ............................ 371/16
4,429,368 1/1984 Kurii .................................... 371/19

Primary Examiner—Jerry Smith
Assistant Examiner—Mark Ungerman
Attorney, Agent, or Firm—John H. Bouchard; Saul A. Seinberg

[57] ABSTRACT

A method for verifying the architectural integrity of a newly written or modified instruction set in a limited operating environment is described. More particularly, this methodology is adapted to perform such verification even though the processor under test has only a one or a few instructions in its partially complete instruction set. Such verification is accomplished using a minimum test driver, under control of a test processor, which loads the data necessary to execute the instruction being tested. The test system also provides actual or simulated I/O capabilities. After execution of that instruction, the test driver directs capture of the execution results for appropriate use. As an aid in performing the verification test, the test driver is provided with an invalid command that forces return of control to the test processor. In operation, the processor to be microcoded is tested instruction by instruction, via shared memory, with microcode corrections being made on the same basis to avoid error propagation into the remainder of the instruction set as it is developed.

11 Claims, 2 Drawing Figures

TEST VERIFICATION OF PROCESSOR ARCHITECTURE HAVING A PARTIAL INSTRUCTION SET

BACKGROUND OF THE INVENTION

1. Field of the Invention

This invention is concerned with a method for verifying the architectural integrity of a processor having only a limited or partial instruction set. More particularly, this invention is directed to a methodology for performing such verification on a minimal instruction set or on single instructions to control and then cause execution thereof and to then capture the results of execution.

2. Description of the Prior Art

It is well known that a newly written or significantly modified instruction set for a given processor needs to be tested and proper execution thereof verified before that set can be relied on. Traditionally, software written to verify the operating architectural integrity of such an instruction set has been written as comprehensive programs that were resident in the processor under test. This approach requires a rather complete implementation of the instruction set and an operational input/output (I/O) facility before serious testing can and does begin.

Instructions have been tested in the past on an individual basis, but such testing requires one to employ hand loops that are manually entered, generally via an operator's console. It was found, however, that the number of different drivers which resulted from the many microcode test efforts, made it difficult to standardize such testing or trust its results, even where testing different code portions of the same instruction set. In addition, this non-automated manual entry verification approach was subject to frequent non-microcode error entry and was, therefore, not conducive to efficient testing.

Thus, the prior art relating to architectural verification and/or diagnostics is primarily concerned with automated and semi-automated means and methods for discovering microcode or hardware problems after the complete instruction set and I/O routines have been written. Debugging is generally a piecemeal effort that is serial in nature, discovery of a first bug leading to discovery of related or subsequent bugs, requiring large test driver programs to exhaust all possibilities. Commonly assigned U.S. Pat. No. 4,268,902 to Berglund et al and U.S. Pat. No. 4,312,066 to Bantz et al are typical of such prior art approaches. These patents are both directed to diagnostic and debug methods in which a service or diagnostic processor is attached to a fully operational host having a complete instruction set and full I/O capability to test or diagnose the instruction set or to find the cause of a particular host error. Similar approaches are detailed in commonly assigned U.S. Pat. No. 3,618,028 to Johnson et al and U.S. Pat. No. 3,825,901 to Golnek et al.

Unfortunately, utilization of these prior art methods required that operational verification of a new or substantially modified instruction set be held in abeyance until the set was completed and full I/O capability provided. In addition, errors made during the development stage, particularly during the early portion thereof, were often propagated through the entire development effort and not found until that effort was completed and verification testing performed. This meant that additional time had to be spent correcting or rewriting all of the code that contained such propagated errors rather than merely correcting an erroneous instruction.

OBJECTS AND SUMMARY OF THE INVENTION

Accordingly, it is a principal object of the present invention to provide a method for eliminating architectural errors and verifying proper microcode operation by utilizing a minimal driver to verify, as early in the design stage as possible, the operational integrity of single instructions or small combinations thereof in order to avoid propagation of early development errors.

It is also a principal object of the present invention to provide such a method wherein the microcode can be implemented in a top down manner to insure complete testing of each instruction and of the test package for proper regression testing of all changes.

It is another object of the present invention to provide a method of verifying microcode operational integrity that utilizes a driver program of minimum size which is adapted to control verification testing on an instruction by instruction basis.

It is yet another object of the present invention to provide such a method wherein the support processor provided to control verification testing also furnishes actual or simulated I/O services.

It is a further object of the present invention to provide a method of verifying the operational integrity of an instruction set or portion thereof wherein the support processor and the processor under test share a common memory.

These and other objects of the present invention are achieved by a methodology of verification wherein a minimum test driver, under control of a test processor, loads the data necessary to execute the instruction being tested. After execution of that instruction, the test driver directs capture of the execution results for appropriate use. As an aid in performing the verification test, the test driver is provided with an invalid command that forces return of control to the test processor. The test driver is loaded and run under control of the support processor which provides actual or simulated I/O capabilities. In operation, the processor to be microcoded is tested instruction by instruction, via shared memory, with microcode corrections being made on the same basis to avoid error propagation.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

Figure 1:
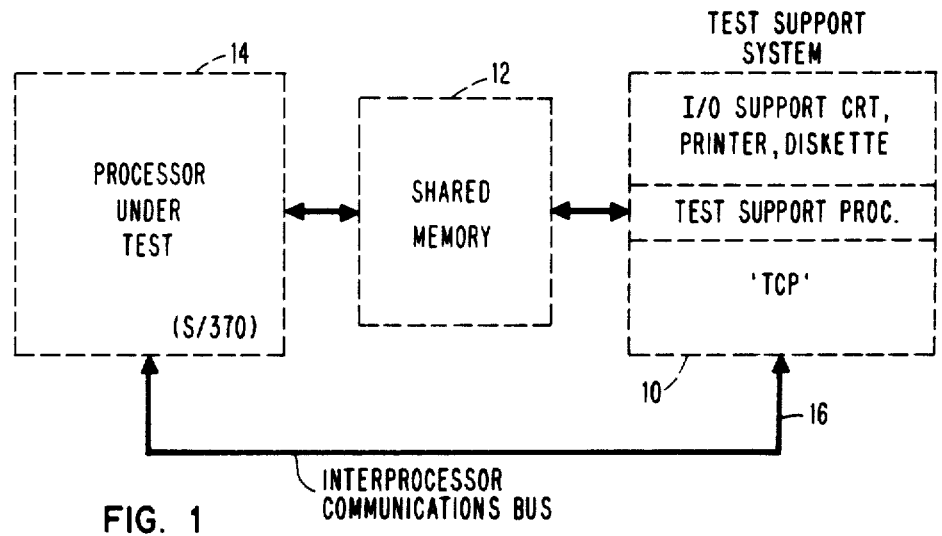
FIG. 1 schematically illustrates a simplified representation of an instruction set verification configuration that is adapted to be used in accordance with the subject invention.

The basic configuration necessary to support the testing of instructions or provide verification of processor architecture, in accordance with the present invention, is shown in FIG. 1. It includes a test support system 10 or TSS and memory 12 which is to be shared by and between the test support system 10 and the processor under test 14 or PUT. The TSS 10 is provided with sufficient storage to at least contain a test control program or TCP, to accommodate the storage shared with the PUT 14 and to retain actual or simulated input/output (I/O) support. I/O support would typically include provision for diskette support, to contain the test cases to be processed, terminal support, preferably video, to input control information and view test results, and printer support, to be used in providing hard copy reports of the test case execution results. In addition to the foregoing, an interprocessor communication bus 16 is provided to facilitate bidirectional exchanges between the TSS 10 and the PUT 12. Finally, the PUT 12 is given minimum capability for providing its own housekeeping functions. It is, therefore, able to load, store and otherwise manipulate its control, general purpose and floating point registers.

Given the basic requirements set forth above, the specific verification environment which follows and the assumption that an additional instruction is to be added to the repertoire of the PUT 12, the following will describe how the "new" instruction is to be tested. It will be assumed, for purposes of this description, that the PUT 12 is a System 370 architectured processor, of the type manufactured by International Business Machines Corporation, and that the example instruction to be added is the S/370 instruction 'MVCIN'. As used herein, the term "limited instruction set" refers to an instruction set that is rather limited, i.e., not complete. In fact, the limited instruction set of the processor under test in the following description is fixed at one, the single instruction.

For those readers who may be unaware of its function, 'MVCIN' provides for an inverse move, that is, a storage-to-storage move which places the second operand specified by the instruction in the location of the first operand specified by the instruction, with the left-to-right sequence of the second operand's bytes inverted as stored. The first operand address designates the leftmost byte of the first operand. The second operand address designates the rightmost byte of the second operand. Both operands have the same length. The result is obtained as if the second operand were processed from right-to-left and the first operand from left-to-right. The second operand may wrap around from low to high memory and the first operand may wrap around from high to low memory. The contents of each byte moved remain unchanged.

The immediately following description is that of a test case program which is employed for the purpose of testing and verifying operation of the 'MOVE INVERSE' instruction. Many test cases must be developed to exercise every condition expected, executed and produced by the instruction. The control program TCP in the TSS 10 must therefore read each of the following records and insure that the data in each record is correct. The data is then stored in the shared memory 12 for subsequent processing as a result of exercise of the test case.

Example Test Case Program

1. Z'00001' GEN, MVCIN
2. * MOVE INVERSE: MOVE 16 BYTES WITH LAST

Example Test Case Program (-continued)

* BYTE OVERLAP
3. ******************************************
4. * THE FOLLOWING RECORDS ARE USED TO SET
   * UP THE TEST CASE FOR EXECUTION
5. ******************************************
6. I'E80F1200121E'                    * INSTRUCTION
7. G1(00008000)                       * INITIALIZE GPR
8. SA'8200'L'16'XAAA ... AAA'         * INITIALIZE
                                        STORAGE
9. SA'8210'L'16'X555 ... 555'         * INITIALIZE
                                        STORAGE
10. P'0008000000005000'                * SET PSW
11. RESULTS=                           * INITIATE
                                        EXECUTION
12. ******************************************
13. * THE FOLLOWING RECORDS ARE USED TO COM-
    * PARE AGAINST THE EXECUTION RESULTS
14. ******************************************
15. SA'8200'L'16'X555 ... 5AA'
16. SA'8210'L'16'X555 ... 555'
17. SA'88'L'4'X00020000
18. END
19. ******************************************

The first line or record of the test case is a control record that indicates the start of a new test case and the need, if any, of setting up test conditions that are unique to the new test case. The next four lines are comments or internal documentation describing the nature and intent of the test case. Line 6 of the test case is the hexidecimal (hereinafter hex) representation of the MOVE INVERSE instruction which is placed in memory in accordance with the address given in the instruction address field of the PSW record. Line 7 indicates the hex value '00008000' to which general purpose register 1 (GPR1) of the PUT 10 is initialized. Lines 8 and 9 initialize locations in the shared memory 12 to the sixteen bit hex values shown. More specifically, these records initialize storage, at locations 8200–820F with a hex value of 'AAA...AAA' and locations 8210–821F with a hex value of '555...555'. Line 10 sets a program status word (PSW) for execution, which indicates where in memory the instruction has been placed. In this instance, the instruction address of the PSW is used to locate the address of the test instruction. The location of the PSW in storage is employed to establish the address pointed to by the LOAD PSW instruction in the test control program, see below, at label 'PSWADDI'. The RESULTS=record, line 11, indicates to the control program that execution may proceed, that the test case has been sufficiently initialized. Lines 15 and 16 are known valid results, which are stored in shared memory 12, to which the instruction execution results will be compared in order to verify proper execution. They represent the condition of storage subsequent to execution of the test case. Line 17 of the test case is an expected interruption code and instruction length which is used for comparison purposes after execution of the instruction being tested. Line 18 signifies the end of the test case program, that result comparison and reporting can begin. As inferred above, all lines of the test case program that start with an asterisk indicate a comment or separator line used to internally document the test case program itself.

A processor under test control program or PUTCP is utilized to provide the facility by which the PUT registers are initialized or loaded. Obviously, any storage initialization requirements can be satisfied via shared memory 12. However, loading the PUT 14 internals requires only a minimum of test support system aid. It should be noted that the mechanism for storing the registers of the PUT 14 is also present in the PUTCP and will be explained hereinafter in greater detail.

The PUTCP contains those instructions which must be operational on the PUT 12 in order to proceed with further testing. In this particular example, the processor being microcoded is an IBM S/370, which requires the loading of sixteen general purpose and control registers. While that requirement must, therefore, be accommodated by the PUTCP, this control program is otherwise comprised of a minimum number of instructions.

| | | Example Processor Under Test Control Program | |
|---|---|---|---|
| | | THIS PROGRAM IS TO BE LOADED FROM TESTER 10 INTO | |
| | | THE PRIMARY MAIN STORE FOR SUBSEQUENT EXECUTION. | |
| | | THIS PROGRAM IS USED TO INITIALIZE AND PROPERLY | |
| | | CONDITION THE PUT 12 FOR EXECUTION OF THE TEST | |
| | | CASE AND TO ASSIST IN CAPTURING THE RESULTS OF | |
| | | TEST CASE EXECUTION. | |
| | ORG | *+X'00400' | |
| | USING | *,15 | |
| BEGIN | B | START1 | |
| R0 | EQU | 0 | |
| RF | EQU | 15 | |
| | DS | 0F | |
| * | | GPR BUFFER AFTER EXECUTION | |
| GPRE | EQU | * | |
| GEN0E | DC | X'00000000' | GENERAL REGISTER 0 |
| GEN1E | DC | X'00000000' | GENERAL REGISTER 1 |
| GEN2E | DC | X'00000000' | GENERAL REGISTER 2 |
| GEN3E | DC | X'00000000' | GENERAL REGISTER 3 |
| GEN4E | DC | X'00000000' | GENERAL REGISTER 4 |
| GEN5E | DC | X'00000000' | GENERAL REGISTER 5 |
| GEN6E | DC | X'00000000' | GENERAL REGISTER 6 |
| GEN7E | DC | X'00000000' | GENERAL REGISTER 7 |
| GEN8E | DC | X'00000000' | GENERAL REGISTER 8 |
| GEN9E | DC | X'00000000' | GENERAL REGISTER 9 |
| GENAE | DC | X'00000000' | GENERAL REGISTER 10 |
| GENBE | DC | X'00000000' | GENERAL REGISTER 11 |
| GENCE | DC | X'00000000' | GENERAL REGISTER 12 |
| GENDE | DC | X'00000000' | GENERAL REGISTER 13 |
| GENEE | DC | X'00000000' | GENERAL REGISTER 14 |
| GENFE | DC | X'00000000' | GENERAL REGISTER 15 |
| * | | GPR BUFFER FOR INITIALIZATION | |
| GPRI | EQU | * | |
| GEN0I | DC | X'00000000' | GENERAL REGISTER 0 |
| GEN1I | DC | X'00000000' | GENERAL REGISTER 1 |
| GEN2I | DC | X'00000000' | GENERAL REGISTER 2 |
| GEN3I | DC | X'00000000' | GENERAL REGISTER 3 |
| GEN4I | DC | X'00000000' | GENERAL REGISTER 4 |
| GEN5I | DC | X'00000000' | GENERAL REGISTER 5 |
| GEN6I | DC | X'00000000' | GENERAL REGISTER 6 |
| GEN7I | DC | X'00000000' | GENERAL REGISTER 7 |
| GEN8I | DC | X'00000000' | GENERAL REGISTER 8 |
| GEN9I | DC | X'00000000' | GENERAL REGISTER 9 |
| GENAI | DC | X'00000000' | GENERAL REGISTER 10 |
| GENBI | DC | X'00000000' | GENERAL REGISTER 11 |
| GENCI | DC | X'00000000' | GENERAL REGISTER 12 |
| GENDI | DC | X'00000000' | GENERAL REGISTER 13 |
| GENEI | DC | X'00000000' | GENERAL REGISTER 14 |
| GENFI | DC | X'00000000' | GENERAL REGISTER 15 |
| * | | CONTROL REGISTER ACTUAL RESULTS | |
| CTLRE | EQU | * | |
| CTL0E | DC | X'00000000' | CONTROL REGISTER 0 |
| CTL1E | DC | X'00000000' | CONTROL REGISTER 1 |
| CTL2E | DC | X'00000000' | CONTROL REGISTER 2 |
| CTL3E | DC | X'00000000' | CONTROL REGISTER 3 |
| CTL4E | DC | X'00000000' | CONTROL REGISTER 4 |
| CTL5E | DC | X'00000000' | CONTROL REGISTER 5 |
| CTL6E | DC | X'00000000' | CONTROL REGISTER 6 |
| CTL7E | DC | X'00000000' | CONTROL REGISTER 7 |
| CTL8E | DC | X'00000000' | CONTROL REGISTER 8 |
| CTL9E | DC | X'00000000' | CONTROL REGISTER 9 |
| CTLAE | DC | X'00000000' | CONTROL REGISTER 10 |
| CTLBE | DC | X'00000000' | CONTROL REGISTER 11 |
| CTLCE | DC | X'00000000' | CONTROL REGISTER 12 |
| CTLDE | DC | X'00000000' | CONTROL REGISTER 13 |
| CTLEE | DC | X'00000000' | CONTROL REGISTER 14 |
| CTLFE | DC | X'00000000' | CONTROL REGISTER 15 |
| * | | CONTROL REGISTER INITIAL SETTINGS | |
| CTLRI | EQU | * | |
| CTL0I | DC | X'000000E0' | CONTROL REGISTER 0 |
| CTL1I | DC | X'00000000' | CONTROL REGISTER 1 |
| CTL2I | DC | X'FFFF0000' | CONTROL REGISTER 2 |
| CTL3I | DC | X'00000000' | CONTROL REGISTER 3 |
| CTL4I | DC | X'00000000' | CONTROL REGISTER 4 |

-continued

Example Processor Under Test Control Program

* THIS PROGRAM IS TO BE LOADED FROM TESTER 10 INTO
* THE PRIMARY MAIN STORE FOR SUBSEQUENT EXECUTION.
* THIS PROGRAM IS USED TO INITIALIZE AND PROPERLY
* CONDITION THE PUT 12 FOR EXECUTION OF THE TEST
* CASE AND TO ASSIST IN CAPTURING THE RESULTS OF
* TEST CASE EXECUTION.

| | | | |
|---|---|---|---|
| CTL5I | DC | X'00000000' | CONTROL REGISTER 5 |
| CTL6I | DC | X'00000000' | CONTROL REGISTER 6 |
| CTL7I | DC | X'00000000' | CONTROL REGISTER 7 |
| CTL8I | DC | X'00000000' | CONTROL REGISTER 8 |
| CTL9I | DC | X'00000000' | CONTROL REGISTER 9 |
| CTLAI | DC | X'00000000' | CONTROL REGISTER 10 |
| CTLBI | DC | X'00000000' | CONTROL REGISTER 11 |
| CTLCI | DC | X'00000000' | CONTROL REGISTER 12 |
| CTLDI | DC | X'00000000' | CONTROL REGISTER 13 |
| CTLEI | DC | X'82000000' | CONTROL REGISTER 14 |
| CTLFI | DC | X'00000000' | CONTROL REGISTER 15 |
| | DS | 0D | |
| PSWADDI | DC | X'00000000' | INITIAL PSW |
| | DC | A(INTERR) | |
| SVCPSWN | DC | X'00080000' | NEW SVC PSW |
| | DC | A(INTERR) | |
| START1 | EQU | * | |
| | LM | R0,RF,GPRI | LOAD ALL GPRS |
| | LCTL | R0,RF,CTLRI | LOAD ALL CONTROL REGS |
| | LPSW | PSWADDI | |
| INTERR | EQU | * | SVC INTERRUPT ADDRESS |
| | STM | R0,RF,GPRE | STORE ALL GPRS |
| | STCTL | R0,RF,CTLRE | STORE ALL CONTROL REGS |
| | DC | 'B20F' | RETURN CONTROL TO THE |
| * | | | TESTER VIA A CURRENTLY |
| * | | | INVALID INSTRUCTION |
| | END | | |

In addition to loading the above program into shared memory 12, the Test Support System 10 must set certain other memory areas to insure proper execution of the PUT 14. For example, in the given PUTCP, it is assumed that the restart PSW at memory location 0 and SVC PSW at memory location 60, at a minimum, are initialized to their appropriate values. Thus, in the program above, 'INTERR' must be the address in the new SVC PSW and '000400' the address in the restart new PSW. It is only necessary that this be done once during the testing procedure. It has been found helpful to intialize other CPU critical areas to values which will provide some trace of erroneous execution. Thus, it would be wise to initialize all new PSW addresses to 'INTERR' to insure a store of register values, which values can then be used at a later time in debugging.

Figure 2:
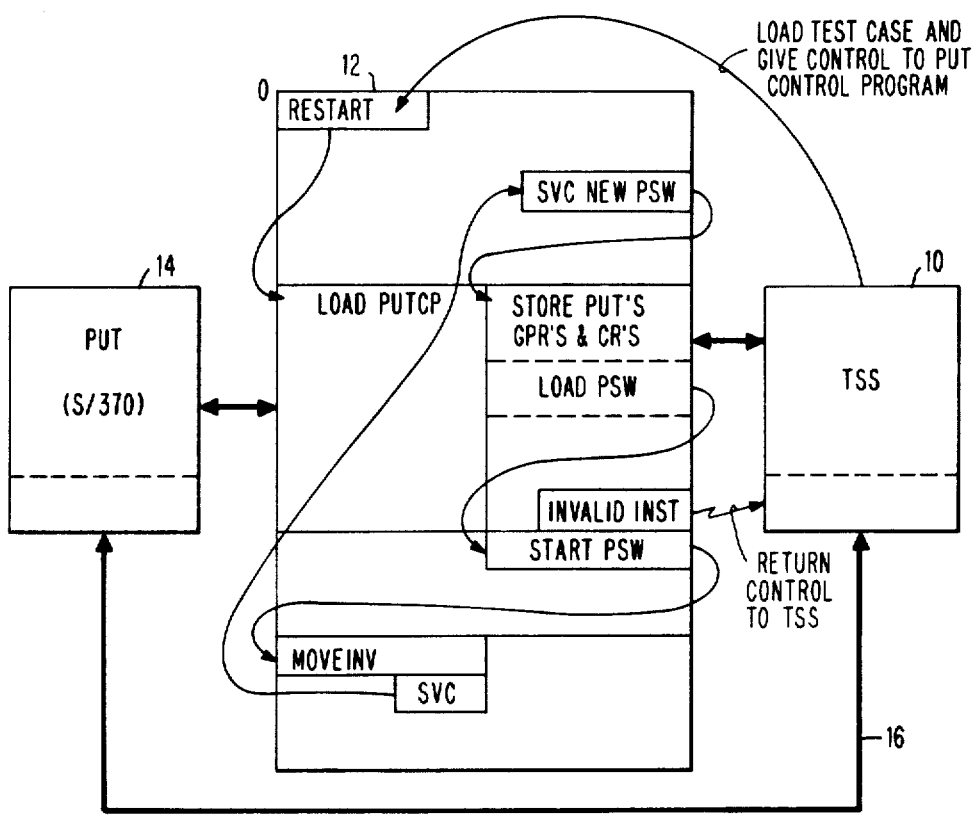
FIG. 2 depicts a simplified schematic flowchart of the testing of an example instruction set in accordance with the method of the present invention employing the arrangement shown in FIG. 1.

In operation, the testing and verification of the newly added instruction goes forward in the following manner which is schematically represented in FIG. 2. The test case is read from a diskette and each record is verified for accuracy by the Test Support System or TSS 10. If any one of the records is found to be in error, the test case is bypassed, with appropriate alarm of that fact. As in the example test case, the first record is a control record that indicates to the TSS 10 the beginning of a new test case and the need, if any, to set up any test conditions unique to that particular test case. Once PUT 14 storage has been initialized with the minimal control program and the test case data, it is appropriate to have the PUT begin execution. In the present example of a S/370 PUT, control is passed by causing a program restart. While the PUT 14 has control, the TSS 10 waits for execution of the PUTCP to be completed and for control to be passed back to it.

The PSW placed in storage address 0 will then be invoked and instructions will begin executing at the address pointed to by the PSW instruction address. The minimal PUTCP entry point is at that address. The general purpose registers are next initialized using the data from the storage areas loaded from the test case records. Similarly, the control registers are also initialized from the storage areas that have been loaded with data from the test case records. Control is then passed to the test case instruction in storage via the LOAD PSW instruction 'LPSW'. The test case instructions are then executed. The last instruction executed, placed at the end of the test case by the TSS control program, is a supervisor call 'SVC'. When this instruction is executed, it causes the supervisor call PSW to be loaded and execution then proceeds at the PSW instruction address, which in this case is label 'INTERR'. At 'INTERR', the general purpose registers are stored back into shared store 12, as are the control registers.

The final stage of verification turns control back to the TSS 10. This requires the microcode to recognize some specific instruction as calling for return of control from the PUT 14. It has been determined that the most effective way in which to return control, without having to implement or be responsive to a larger number of instructions in the test control program, is to have the PUT 14 react to an unusual instruction in a predictable manner. More specifically, an invalid instruction is used that, when encountered, forces the PUT 14 to relinquish control. In this particular example, a 'B2F0' is utilized as the invalid instruction, which is invoked to trigger the desired return of control.

Once control has been returned to the TSS 10, comparison of the results of execution to predetermined values can be initiated and a report concerning such results obtained. The areas of shared storage where data is stored, initially by the TSS 10 and after execution by the PUT 14 for its general purpose and control registers, are known to the TSS 10. In addition, the TSS 10 is also aware of any key areas of architectural significance that might have been cleared or set by itself to a value that would insure that such key areas were not altered by execution of the instruction being tested. With this knowledge, the tester begins to compare the results presented by execution of the test case, records 15 through 17 in this instance, to what was actually present in the PUT's general purpose and control registers. Architecturally significant areas are now also compared to insure that no changes have occurred therein. All differences between actual and expected results are reported by output thereof to a system printer, the TSS CRT, a diskette or tape, in accordance with the user's wishes.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. A method for verifying the architectural integrity of a processor under test having a limited instruction set, said method comprising the steps of:
   (a) providing a test support processor connected to communicate with the processor under test;
   (b) providing input/output support, including at least the capability for a display terminal, a printer and a disk drive, connected to said test support processor for use in association with said processor under test;
   (c) providing a minimally sized test control program to read test cases and initialize memory with data for an instruction to be tested, said test control program initializing the registers of said processor under test;
   (d) providing storage means, connected between said processor under test and said test processor, that is accessible and is to be shared by both of the processors;
   (e) loading said test control program into said shared memory and loading data sufficient to test one of the instructions of said limited instruction set of said processor under test into said shared memory, said test control program initiating execution of said one of the instructions by initiating execution of said data loaded into said shared memory;
   (f) passing verification test control to said processor under test to thereby cause execution of said instruction thereof; and thereafter
   (g) said test control program capturing and storing the results of execution of said instruction in said shared memory for subsequent inspection and comparison to desired results.

2. The method according to claim 1 which comprises the additional step of passing control of said verification test back to said test processor after execution of the instruction being verified has been completed.

3. The method according to claim 2 wherein the passing of control of said verification test back to said test processor is accomplished by imbedding an invalid command in said test control program which, when encountered, forces a return of control to said test processor.

4. The method according to claim 1 wherein said input/output support is provided by having said test processor simulate the same.

5. The method according to claim 4 which comprises the additional step of passing control of said verification test back to said test processor after execution of the instruction being verified has been completed.

6. The method according to claim 5 wherein the passing of control of said verification test back to said test processor is accomplished by imbedding an invalid command in said test control program which, when encountered, forces a return of control to said test processor.

7. A method of testing the hardware and the microcode associated with a processor under test, comprising the steps of:
   loading a minimally sized test control program into a memory, said test control program functioning to set up a test environment which may be used in association with the testing of the execution of any one of a plurality of instructions of said processor under test;
   loading a specific test case program into said memory, said test case program including data and instructions associated with the test of a specific one of said plurality of instructions of said processor under test, the test control program and the specific test case program constituting a composite program;
   executing said composite program, said processor under test performing the executing step, thereby producing a set of actual results;
   comparing the set of actual results with a set of theoretical, correct results thereby producing a set of discrepancies, said discrepancies being used to analyze and correct any errors associated with the hardware or the microcode of the processor under test.

8. The method of claim 7, wherein said test control program:
   initializes the registers of said processor under test, and
   initiates execution of said specific test case program.

9. The method of claim 8, wherein:
   said specific test case program loads said data into said registers of said processor under test,
   the processor under test executing said instructions associated with the test of a specific one of said plurality of instructions using said data stored in said registers thereby yielding said set of actual results.

10. The method of claim 9, wherein said test control program stores said set of actual results in said memory, said set of actual results being compared with said set of theoretical, correct results via said comparing step thereby producing said set of discrepancies.

11. The method of claim 10, wherein said test control program and said test case program are loaded into said memory from an input/output support means by a test support processor, said test support processor performing said comparing step using said set of actual results stored in said memory and said set of theoretical, correct results.

* * * * *